April 2, 1968     K. FLURY     3,376,025
EQUIPMENT FOR HUMIDIFYING AIR
Filed Feb. 19, 1965     2 Sheets-Sheet 1

INVENTOR.
Karl Flury
BY
Watson, Cole, Grindle & Watson
Attys.

United States Patent Office 3,376,025
Patented Apr. 2, 1968

3,376,025
EQUIPMENT FOR HUMIDIFYING AIR
Karl Flury, Adliswil, Zurich, Switzerland, assignor to Defensor, Zurich, Switzerland
Filed Feb. 19, 1965, Ser. No. 434,747
Claims priority, application Switzerland, Feb. 29, 1964, 2,574/64
3 Claims. (Cl. 261—29)

ABSTRACT OF THE DISCLOSURE

Air humidifying apparatus having a tank for containing a liquid and at least one centrifugal distributor disc together with means for feeding liquid from the tank to an inner portion of the disc. A fan produces a stream of air to remove at least some of the droplets of liquid thrown outwardly from the disc, and a guide ring extends around, below and spaced from the distributor disc for directing the air stream and collecting the droplets of liquid thrown outwardly from the disc.

---

The present invention relates to equipment for humidifying air and, more particularly, for humidifying air flowing through a duct, which is conveyed, warmed or unwarmed, to various rooms in a building.

The equipment comprises the usual tank of liquid, at least one motor-driven centrifugal distributor disc, to the centre of which is connected a suction pipe which extends into the tank of liquid, a fan for producing a stream of air to take away the droplets of liquid thrown outwardly by the distributor disc, and a guide ring extending around, below and spaced away from the distributor disc to direct the air stream and to collect all the droplets of liquid thrown out by the disc but not carried away by the air stream.

The essential difference between existing devices of the type described and the device here proposed is that, in the latter, the guide ring is provided with at least two separate drainage outlets, one of which leads to the outside of the equipment and at least one other of which leads back into the tank of liquid.

By virtue of this feature, equipment in accordance with the invention is constantly being flushed through with liquid during operation, so that the portion of liquid that is led out of the equipment carries away considerable amounts of the dirt particles and mineral substances brought into the equipment by the air and by the water fed into the tank of liquid. Thus, all parts of the equipment coming in any way into contact with the liquid are made to some extent self-cleaning, so that the intervals at which the equipment has to be regularly taken apart for thorough cleaning can be extended.

Figure 1:
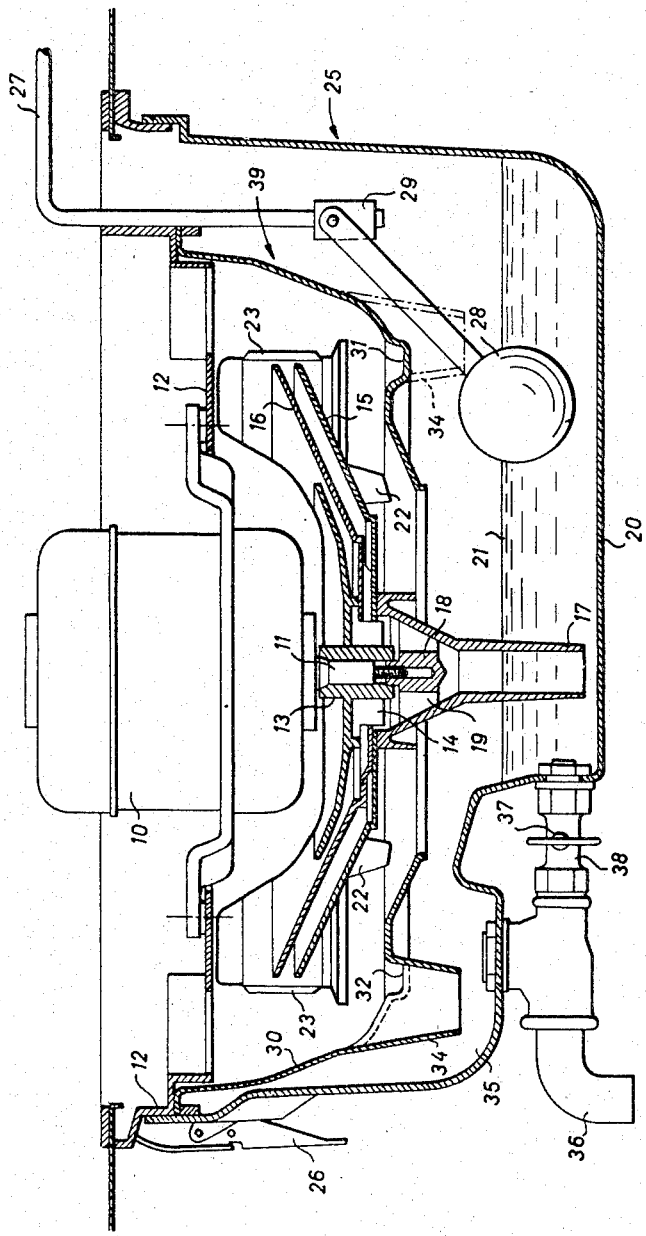
Figure 2:
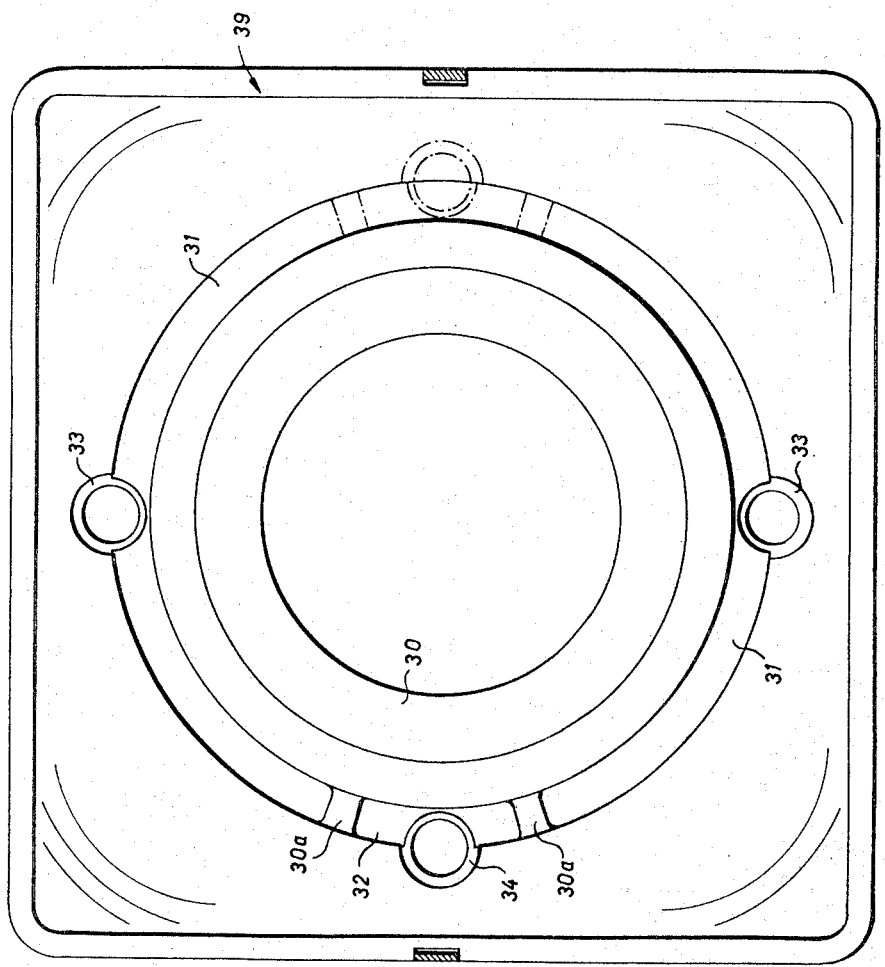

One construction of air humidifying equipment in accordance with the invention will now be described by way of example, with reference to the accompanying drawings, in which:

FIGURE 1 shows an air humidifier, partly in vertical section and partly in side elevation; and FIGURE 2 is a plan of the member inserted into the equipment to form the guide ring.

The device illustrated has an electric driving motor 10, with a vertical spindle 11. The motor 10 is secured to a stationary frame member 12 of the equipment. On the motor spindle 11 is mounted a hub member 13, which has a centering member consisting of a number of radial fins 14. Two centrifugal distributor discs 15 and 16, which each have a central opening, are fitted over centering member 14 and held to it by the upper end of suction intake pipe 17, which is connected to the central openings in distributor discs 15 and 16. Intake connection 17 contains a central member 18, which is attached by a number of radial fins, 19, to the intake connection and is screwed onto a threaded extension of spindle 11. The open bottom end of suction pipe 17 extends into tank 20, which holds a supply of liquid 21 for humidifying the air. The lower distributor disc 15 is provided with a number of fan blades 22 to produce a current of air through the equipment. Around distributor discs 15 and 16 is a stationary impact-surface ring, 23, consisting of a multiplicity of small plates separated by gaps. The impact-surface ring 23 is attached to the frame member 12 of the equipment.

The tank 20 is formed in a troughed member 25, which is suspended from the fixed frame member 12 by means of quick-release attachments 26. Feed pipe 27, for supplying water to the tank 20, is attached to the frame 12 and has a valve 29 operated by a float 28. In this way, the water 21 is always maintained at approximately the same level.

A guide ring 30 surrounds and is spaced from the distributor discs 15 and 16 and impact-surface ring 23. This guide ring 30, which also extends below discs 15 and 16, serves to guide the stream of air produced by fan blades 22 and to collect whatever droplets of liquid thrown out by the discs have not been carried away by the air stream. The guide ring 30 contains an annular collecting channel 31/32, sub-divided by two raised webs 30a into two separate sections 31 and 32 (see FIGURE 2). The section 32 is much shorter than the other section. Two drainage outlets 33 (FIGURE 2) are connected to the larger collecting channel section, 31, and terminate in tank 20. The smaller collecting channel section 32 has a single drainage outlet 34 (FIGURES 1 and 2), terminating in a trough 35, formed longside tank 20 in troughed member 25. Trough 35 is fitted with a permanently open drainage connection 36, which leads out of the equipment. A connecting member 38 closed by a tap 37, leads from tank 20 into drainage connection 36.

Guide ring 30, with collecting channel 31/32 and drainage outlets 33 and 34, is formed by insertion member 39, which can be fixed to frame 12 in either of two positions, as desired. In one position, represented in the drawings in solid line, draining outlet 34 lies above trough 35, as stated above. If, however, insertion member 39 is turned through 180° from this position before being fitted, drainage outlet 34 will occupy the position shown in broken lines in FIGURES 1 and 2. It is then not over trough 35, but over tank 20. Whichever of the two positions is occupied by insertion member 39, both the other drainage outlets, 33, always lie above tank 20.

The general mode of operation of the equipment described is well known, as regards the production of a stream of mist for humidifying the air, and therefore need not be described here. Suffice it to say that when motor 10 is running, liquid is conveyed to distributor discs 15 and 16 by suction intake 17, the discs throwing the liquid out in the form of a thin film. The film of liquid is broken up by the plates of impact-surface ring 23 into tiny droplets, which are intended to be carried away by the current of air set up by fan blades 22. However, a large proportion of the liquid thrown out by discs 15 and 16 cannot be caught up by the air stream and carried away to humidify the air, but finds its way to guide ring 30 and thence into collecting channel 31/32.

What is distinctive about the mode of operation of the device described is as follows. Let it be assumed that insertion member 39 is in the position shown in solid line. Most of the liquid caught by guide ring 30 flows into section 31 of the collecting channel, since this section represents considerably more than half the channel as a whole. From section 31, the accumulated liquid runs back through drainage outlets 33 into tank 20. A smaller portion of the liquid caught by guide ring 30 passes into section 32 of the collecting channel and from there flows through drainage outlet 34 into trough 35, whence it is led out of the equipment by way of drainage connection 36. Whereas the liquid collected by section 31, after its return to tank 20, is once more available for "atomisation" by distributor discs 15 and 16, this is not so with the smaller quantity of liquid collected by section 32.

Mineral substances and impurities are constantly being introduced into the equipment by the water supplied to tank 20 by feed pipe 27. The air flowing through the equipment, too, may be bringing dust and other foreign particles with it. The greater part of the mineral substances and other impurities cannot leave the equipment along with the stream of water droplets, but settle in tank 20, on intake pipe 17, on distributor discs 15 and 16, on impact-surface ring 23, on guide ring 30 and on all other surfaces of the equipment coming into contact with the water, in the form of a deposit. This deposit increases continuously after the equipment has been in operation for some time, because further impurities are constantly being brought in and hardly any removed. This phenomenon can be observed in all existing air humidifiers; the more impure the water used, the more marked the accumulation of deposit. This deposit reduces the efficiency of the equipment and may put it completely out of action if not cleaned out regularly. By virtue of the partial elimination of liquid, through drainage connection 36, from the equipment described and illustrated, a continuous rinsing and cleaning action is brought about, whereby at least some of the particles of impurities and solid mineral substances are washed out of the equipment. As a result, the intervals at which the equipment is regularly taken apart and cleaned can be extended.

The liquid emerging from drainage connection 36 also provides a ready means of observing whether the equipment is running and is converting water into spray. This is of particular importance where the equipment is used in conditions in which, for structural reasons, the mist produced cannot be seen—for instance, when the flow of mist is being blown directly into an air duct. In point of fact, the runnig of motor 10 does not afford any reliable check on the proper functioning of the equipment, since it would be possible, for example, for the motor actually to be running while no liquid whatever was being reduced to droplets by distributor discs 15 and 16, either because of obstruction of the suction intake or on account of the absence of water supply 21. Such a fault would be at once apparent from the non-emergence of liquid from drainage connection 36.

Where connection 36, instead of being open-ended, is extended in the form of a pipe, it is of advantage to provide a transparent window in it, to make possible the supervision referred to above.

The proportion of liquid led out of the equipment depends on the relative sizes of the two collecting channel sections 31 and 32. According to the amount of impurity to be expected in the water available, so section 32, which is associated with drainage connection 36, should be made larger or smaller. This can be simply arranged by altering the positions of raised webs 30*a*. Tap 37 can be opened when it is desired to empty tank 20, as when shutting down the equipment, for example, or prior to the removal of troughed member 25 for thorough cleaning.

In cases where very pure or pre-cleaned water is available or where water is scarce, insertion member 39 may be fitted in the other position, turned through 180°, in drainage outlet 34 of the smaller collecting channel section 32 also opens into tank 20. No water will then flow away through drainage connection 36.

What we claim is:

1. Air humidifying apparatus comprising a tank for containing a liquid, at least one centrifugal distributor disc having a central opening and rotatable about a substantially vertical axis, means including a suction pipe connected to said central opening for feeding liquid from said tank to an inner portion of said distributor disc, a fan for producing a stream of air to take away at least some of the droplets of liquid thrown outwardly by said disc, and a guide ring extending around, below and spaced away from the distributor disc for directing the air stream and for collecting droplets of liquid thrown outwardly by the disc but not carried away by the air stream, said guide ring being provided with a horizontally extending annular collecting channel subdivided by two radial webs into two separate sections, one of said separate sections including means communicating with at least one drainage outlet leading back into the tank and the other of said separate sections including means communicating with at least one additional drainage outlet for conducting some of the collected liquid out of the equipment through means including a trough and drainage connection on a path by-passing the tank.

2. Air humidifying apparatus according to claim 1, in which a trough-shaped member is provided constituting said tank and said trough, said additional drainage outlet being arranged to discharge into said trough, and said trough having said drainage connection leading out of the apparatus.

3. Air humidifying apparatus according to claim 1, in which an insertion member is provided and including means loosely and movably fitted in a frame above said tank and trough and formed from said guide ring and collecting channel, said insertion member being adapted to be fitted optionally in a second position, and said drainage outlet being so positioned that in the second position of the insertion member both the drainage outlet and additional drainage outlet discharge into said tank.

References Cited

UNITED STATES PATENTS

| | | | |
|---|---|---|---|
| 698,569 | 4/1902 | Sleezer | 210—95 |
| 1,564,949 | 12/1925 | Cramer | 55—230 X |
| 3,044,752 | 7/1962 | Flury | 261—91 X |
| 3,108,147 | 10/1963 | Flury | 261—91 X |
| 3,282,575 | 11/1966 | Allcorn. | |

RONALD R. WEAVER, *Primary Examiner.*